Patented Sept. 5, 1950

2,520,959

UNITED STATES PATENT OFFICE 2,520,959

POLYMERIZATION OF VINYL COMPOUNDS

John R. Powers, Akron, Ohio, assignor to The B. F. Goodrich Company, New York, N. Y., a corporation of New York No Drawing. Application November 6, 1945, Serial No. 627,099

7 Claims. (Cl. 260—92.8)

This invention relates to the polymerization of vinyl compounds in aqueous dispersion, and pertains more specifically to a method of controlling the size of the polymer particles formed by the polymerization reaction.

It is well known that vinyl polymer latices may be prepared by the polymerization of suitable vinyl monomeric materials in aqueous dispersion, and that such latices may be used as coating and impregnating agents. The size of the polymer particles in such latices may vary over a wide range without destroying the utility of the latices; however, the size of the particles has an important effect upon the physical properties, such as viscosity, surface tension, and stability of the latex itself. Moreover, since the total free surface of the polymer particles is greater for a given weight of polymer when the particles are small than it is when the particles are large, the amount of emulsifying or dispersing agents required upon the surface of the particles for stability of the latex is greater (based on the amount of polymer present) in the former case than in the latter. As a result, the physical and chemical properties of polymer deposited from small particle size latex (e. g. by evaporation) tend to be inferior to the properties of polymer deposited from large particle size latex.

For these and other obvious reasons, it is desirable that the size of the polymer particles in the vinyl polymer latices be accurately reproduceable in order to obtain products of uniform properties, and that generally speaking the size of the particles be uniformly large in order to minimize the proportion of dispersing agent required to stabilize the latices.

One object of this invention is to provide means for readily and accurately controlling the size of the polymer particles formed in the latex. Another object is to promote uniformity of particle size in such a latex, and to repress the formation of small polymer particles. Other objects will be apparent from the following description.

The method of this invention comprises maintaining a fixed and definite relation during the course of the polymerization reaction between the amount of dispersing agent present in the reaction mixture or latex, and the available surface area of the polymer particles which are in the process of formation. This relationship is such that sufficient dispersing agent is present at all times to protect the polymer particles against coalescence or coagulation, but that no excess dispersing agent is present, which, as will be pointed out hereinafter, tends to promote the formation of new particles of polymer during the course of the polymerization reaction, and thus to prevent uniformity of particle size, as well as to decrease the average particle size.

The method of this invention is applicable to those monomeric materials which contain a single methylene group attached to a carbon atom by a double bond; that is, compounds which contain a single $CH_2=C<$ group, and which undergo addition polymerization in aqueous dispersion to form high molecular weight linear polymers. The most important class of such materials consists of monomers containing a single olefinic double bond present in a $CH_2=C<$ group, in which the second carbon atom is attached by at least one of the free valences to an electronegative group, that is, a group which increases substantially the polar characteristics of the molecule. Among such monomers are styrene, p-chlorostyrene; esters of alpha-methylene aliphatic monocarboxylic acids, such as methyl acrylate, ethyl acrylate, n-butyl acrylate, isobutyl acrylate, dodecyl acrylate, 2-chlorethyl acrylate, 2-chloropropyl acrylate, 2,2'-dichlorisopropyl acrylate, phenyl acrylate, cyclohexyl acrylate, methyl alpha-chloroacrylate, methyl methacrylate, ethyl methacrylate, methyl ethacrylate; acrylonitrile; methacrylonitrile; acrylamide; vinyl esters, such as vinyl acetate, vinyl chloroacetate, vinyl propionate, vinyl butyrate; vinyl halides, such as vinyl chloride or vinyl bromide; vinyl ethers such as vinyl methyl ether, vinyl isobutyl ether, vinyl 2-chlorethyl ether; vinyl ketones, such as vinyl methyl ketone, vinyl hexyl ketone, methyl isopropenyl ketone; ethylene; isobutylene; vinylidene halides, such as vinylidene chloride, vinylidene chlorofluoride; N-vinyl compounds, such as N-vinyl pyrrole, N-vinyl carbazole, N-vinyl indole, N-vinyl succinimide; and other similar polymerizable materials. The method of this invention is also applicable to the copolymerization of mixtures of two or more of these monomeric materials.

The invention finds its most important use in application to those monomeric materials which comprise predominantly a chloroethylene containing from one to two chlorine atoms on one only of the carbon atoms, and having only hydrogen atoms attached to the remaining valences of the ethylenic carbon atoms. Included in such materials are, for example, vinyl chloride, vinylidene chloride, mixtures of these monomers with each other and with lesser proportions of other copolymerizable monomers such as vinyl acetate, vinyl propionate, vinyl butyrate, esters of an alpha-methylene aliphatic monocarboxylic acid, particularly alkyl esters, such as methyl acrylate, ethyl acrylate, methyl methacrylate, ethyl methacrylate, methyl ethacrylate, butyl acrylate, dodecyl acrylate, or the like. Those monomeric materials which comprise predominantly the specified chloroethylenes, i. e., contain more than 50% by weight of the chloroethylene, are preferred.

It has been found that in the polymerization of such materials in aqueous dispersion, the dispersing agent employed not only acts to stabilize the latex or dispersion, but also serves as the locus or nucleus for formation of new polymer particles under certain conditions. At the beginning of the conventional polymerization process, of course, the second of these two functions is essential to the production of a latex; however, once a suitable number of polymer nuclei has been formed, it is essential, in order to obtain a product of uniform particle size, that the formation of new particles be eliminated as nearly as possible, and that all of the additional polymer formed during the reaction be induced to build up on the particles already present in order to increase their size in as uniform a manner as possible. It has been found that this may be accomplished by correlating the amount of dispersing agents present with the surface area of the polymer particles present.

It will be apparent that the method of this invention, which involves maintaining a fixed relation between the amount of dispersing agent and the surface area of the polymer particles, is applicable only to that period of the polymerization reaction during which an appreciable number of particles of polymer are present, and not to the first part of the reaction during which the initiation of the polymer particles occurs. It should be noted that for the purposes of this invention it is immaterial whether the polymer particles be initiated or formed in the same reaction vessel and during the course of the same reaction, or whether they be introduced into the reaction medium as a "seed" charge of a previously prepared vinyl polymer latex, as is described and claimed in the co-pending application of Walter E. Brown, Serial No. 629,191, filed Nov. 19, 1945, now abandoned.

The amount of dispersing agent which has been found necessary to maintain a stable dispersion of polymer particles without appreciable coalescence and without permitting reaction of an appreciable amount of monomeric material to form new polymer particles is from about 20% to about 60% of the amount theoretically required to saturate the surface of the polymer particles present in the reaction mixture at any given time.

Since the hydrocarbon end of the molecule of the dispersing agent is presumably attached to the polymer particle by a vertical alignment of the molecule at the polymer-water interface, the amount of dispersing agent theoretically required to saturate one unit of surface area, that is, the amount required to form a closely packed unimolecular film on the surface, depends upon the area of the polymer-water interface covered by, or protected by each molecule of dispersing agent (which, for the sake of convenience, will hereinafter be termed the cross-sectional area of the molecule), and upon its molecular weight. The cross-sectional area of the molecule may be determined by the method of Langmuir, Journal of the American Chemical Society 39, 1848 (1917), or by X-ray or electron diffraction methods, or by any other known method. The area in square Angstroms covered by one microgram of dispersing agent is given by the following equation:

$$A = \frac{N_o \times A_o}{10^8 M} \quad (1)$$

where $N_o$ = Avogadro's number
$A_o$ = cross-sectional area of molecule, in square Angstroms
$M$ = molecular weight The diameter of the polymer particles present in the latex or reaction mixture may be determined by means of an ultra-microscope or an electron microscope, or by other suitable means. Since the individual particles are substantially spherical, the surface in square Angstroms of a particle is given by the equation:

$$A_d = \pi d^2$$

where $d$ = diameter in Angstroms

The weight of such a particle in micrograms is:

$$W_d = \frac{\pi d^3 \rho}{6} \quad (3)$$

where $\rho$ is the weight in micrograms of one cubic Angstrom of polymer.

The weight of dispersing agent in micrograms required to cover the surface of a particle of diameter $d$ is obtained by dividing Equation 2 by Equation 1:

$$W = \frac{A_d}{A} = \frac{10^8 \pi d^2 M}{N_o A_o} \quad (4)$$

The weight-percentage of dispersing agent, based on the weight of the polymer, required to cover the surface of a particle of diameter $d$ is obtained by dividing the weight of the dispersing agent 4 by the weight of the particle 3 and multiplying by 100:

$$\text{Percent dispersing agent} = P = \frac{6 \times 10^8 M}{N_o A_o d \rho} \quad (5)$$

or $$P = \frac{9.90 \times 10^{-16} M}{A_o d \rho} \quad (5a)$$

where $M$ = molecular weight of dispersing agent
$A_o$ = cross-sectional molecular area of dispersing agent in square Angstroms
$d$ = diameter of polymer particle in Angstroms
$\rho$ = weight of one cubic Angstrom of polymer in micrograms The foregoing equation is valid only when all the polymer particles present in the latex are of uniform diameter. However, since all of the particles are not initiated instantaneously, there is usually a normal probability distribution of particle sizes. It is therefore necessary to correct the equation for the size distribution by introducing surface distribution and volume distribution factors.

If $\overline{\Delta}$ is the diameter of the particle of average surface, and $\overline{D}$ is the diameter of the particle of average volume, then Equation 5a when derived using these values instead of the numerical average diameter of the particles, becomes:

$$P = \frac{9.90 \times 10^{-16} M \overline{\Delta}^2}{A_o \overline{D}^3 \rho} \qquad (6)$$

This amount of dispersing agent is the amount theoretically required to provide a unimolecular closely packed layer of dispersing agent over the surface of the particles. It has been found that if the amount of dispersing agent actually present is maintained at from about 20% to about 60% of this theoretical value, preferably from about 25 to about 40%, the polymerization will proceed without appreciable coalescence of particles, and without appreciable initiation of new particles.

In applying the method of this invention, the weight of polymer present in the reaction mixture, and the average diameter of the polymer particle are determined. The amount of dispersing agent theoretically required is calculated according to the above equation. The actual amount of dispersing agent is adjusted to between 20 and 60% of this value, and the usual catalysts, buffers, monomeric materials and the like are added. The polymerization is then allowed to proceed at the usual temperature, from about room temperature up to 100° C. or higher, preferably from about 35° to about 60° C. Additional dispersing agent is added during the course of the reaction at such a rate that its concentration is maintained within the desired range. The rate at which dispersing agent is added, of course, will depend upon the rate at which the size of the polymer particles increase, i. e., the rate of conversion of monomer to polymer. The rate of conversion may be measured either by determining the per cent total solids (from which the per cent polymer can readily be determined when the amount of dispersing agent and other solid materials added during the reaction is known) in small samples of the reaction mixture taken at various times during the reaction, or by determining the heat evolved from the reaction mixture if the molecular heat of the reaction is known, or by measuring the diameter of the polymer particles present in the reaction mixture at any given time by means of an electron microscope, etc. Since practically no coalesence of particles or initiation of new particles occurs during the reaction carried out under these conditions, and since the relationship between the average volume, the average surface, and the average diameter of the particles has been found to remain constant during the reaction, the diameter of the particles need not be measured throughout the course of the reaction, but may be calculated from the amount of monomeric material converted to polymer, and from the particle size measured at the beginning of the reaction as shown in the following equations.

Since the diameter of the particles is proportional to the cube root of the volume (and hence the weight) of the particles, the diameter of the particles at any time during the course of the reaction is given by:

$$d_c = d_o \cdot \sqrt[3]{\frac{c}{c_o}} \qquad (7)$$

where $d_o$ = original diameter of the particle
$c_o$ = weight of polymer present at the start of the process
$c$ = weight of polymer present at any subsequent time during the reaction Since the volume-diameter and surface-diameter relations are constants, $$\frac{\overline{\Delta}}{\overline{d}} = B_s \quad (8) \quad \text{and} \quad \frac{\overline{D}}{\overline{d}} = B_v \qquad (9)$$

where $\overline{d}$ = numerical average diameter of particles, these constants may be substituted in Equation 6 to give:

$$P = \frac{9.90 \times 10^{-16} M}{A_o \rho \overline{d}} \cdot \frac{B_s^2}{B_v^3} \qquad (10)$$

Substituting for $\overline{d}$ the value given by Equation 7, the result is:

$$P = \frac{9.90 \times 10^{-16} M}{A_o \rho \overline{d}_o \cdot \sqrt[3]{\frac{c}{c_o}}} \cdot \frac{B_s^2}{B_v^3} \qquad (11)$$

where $\overline{d}_o$ = numerical average diameter of polymer particles at the beginning of the process.

It will be noted that only one variable, $c$, the weight of the polymer during the course of the reaction, appears in this equation, all of the other quantities being fixed at the start of the process. Accordingly, it is a very simple matter to calculate just how much dispersing agent should be present at any stage of the process to obtain the desired result, and to adjust the rate of addition of dispersing agent accordingly.

Although, as has been pointed out above, the initiation of the desired number of polymer particles, and the subsequent building up of these particles to the desired ultimate size by means of the technique herein described may be carried out as a single continuous operation, it has been found that the most satisfactory and reliable results may be obtained by employing a small portion of a previously prepared vinyl polymer latex as a "seed" so that no initiation of polymer particles is necessary at all, the process of this invention being applied from the start of the reaction. The amount of "seed" latex to be used will depend, of course, upon the size of the polymer particles in it, and upon the desired ultimate particle size of the latex to be prepared. As a practical matter, the weight of polymer present in the latex used as "seed" usually varies between about 0.05% and 50% of the weight of the polymer present in the finished latex, preferably between about 0.2% and 20%. The polymer used as "seed" need not be identical in composition with the polymer present in the finished latex, but it should be selected from the same class of polymers. The size of the particles of polymer in the seed latex may vary over a wide range. Latices in which the average diameter of the polymer particles is as small as 100 to 200 Angstroms, or even smaller, may be used as "seed" although they tend to be unstable, and hence must generally be used within a few hours, or at most, a few days of the time when they are prepared.

There is no upper limit on the size of the polymer particles in the seed latex except the obvious facts that they must be smaller in size than the polymer particles in the finished latex.

The monomeric materials may all be introduced at the start of the reaction, but it is generally desirable, in order to facilitate control of the rate of reaction, to introduce the monomers gradually during the course of the reaction. Moreover, it has been found that a large excess of monomeric material in the reaction mixture tends to produce initiation of new polymer particles even when the concentration of dispersing agent is controlled as described herein, although the effect is much less pronounced than is the effect of excess dispersing agent. Even when all monomeric material is added at the start of the reaction, remarkably good results may be obtained by the method of this invention. When a large excess of monomeric material is present for only a short time, as is the case during the first hour of the polymerization reaction described in the following specific example, no substantial initiation of new particles appears to occur. Generally, however, it is desirable to maintain the ratio between the weight of monomer and the weight of polymer in the reaction mixture at any given time less than two to one, preferably less than one to one.

The following specific example is given as a further illustration of the nature of this invention, and is not intended as a limitation upon the appended claims.

It was desired to prepare a polyvinyl chloride latex having polymer particles of an average diameter of 2500 Angstroms using sodium stearate as the dispersing agent. The density of this polymer is 1.4 grams per cubic centimeter, or $1.4 \times 10^{-18}$ micrograms per cubic Angstrom. Since the capacity of the reaction vessel to be used was about 15 gallons, the total amounts of ingredients to be added to the reaction vessel were determined to be, in pounds:

| | |
|---|---|
| Vinyl chloride | 60 |
| Water | 48 |
| Potassium persulfate | 0.27 |
| Ammonium hydroxide (28% aqueous solution) | 0.27 |

At 50° C., the temperature at which it was decided to carry out the reaction, only 95% of the theoretically possible conversion of monomeric material to polymer could be obtained within a reasonable time, so that only 57 lbs. of polymer would be in the finished latex. It was decided to employ as a seed a polyvinyl chloride latex, having the following composition in parts by weight:

| | |
|---|---|
| Polyvinyl chloride | 187 |
| Water | 804 |
| Sodium stearate | 8.25 |

Examination of the seed latex by an electron microscope showed the numerical average diameter of the polymer particles to be 342 Angstroms. Substituting these values in Equation 7, and solving for $c_0$ it is found that the proportion of seed latex used must contain 0.15 lb. of polymer in order to produce a finished latex having a particle size of about 2500 Angstroms. Since the seed latex contains only 18.7% of polymer by weight, 0.8 lb. of the latex must be used, containing, in addition to the polymer, 0.644 lb. of water and 0.0066 lb. of sodium stearate.

In order to determine the amount of dispersing agent which must be present at the start of the reaction, use must be made of Equation 6. By examination of the seed latex with an electron microscope, and application of the usual statistical methods, the following values were determined in Angstrom units:

$$\bar{d} = 342$$
$$\bar{\Delta} = 356$$
$$\bar{D} = 370$$

Hence
$$B_s = 1.041$$
$$B_v = 1.082$$

Inasmuch as sodium stearate, the dispersing agent used, has a cross-sectional molecular area of 22 square Angstroms (Getman & Daniels, Outlines of Physical Chemistry, pages 260–261, John Wiley & Sons, New York, 1943) and a molecular weight of 306, the amount of dispersing agent theoretically required to cover the surface of all of the polymer particles present at the beginning of the reaction, as given by Equation 6 is 24.6% of the weight of the polymer.

An arbitrary value of 35% of the amount theoretically required was chosen as being well within the critical limits of 20% and 60%; at the beginning of the reaction, therefore, this amounts to 8.6% of the weight of the polymer, or 0.013 lb. Since 0.0066 lb. was already present in the seed latex, a like amount was added in water solution. By applying Equation 11 to the finished latex, and multiplying the percentage P so determined by the weight of the polymer in the finished latex (57 lbs.), and dividing by 100, the weight of dispersing agent which would theoretically be required to saturate the surface of the polymer particles in the finished latex is found to be 1.94 lbs. It was arbitrarily decided that the finished latex should contain about 30% of the amount of dispersing agent theoretically required, or 0.58 lb. Since 0.013 lb. was added at the start of the reaction, about 0.57 lb. remained to be added during the course of the reaction. For convenience in handling, this amount of dispersing agent was dissolved in 10.67 lbs. of water (about a 5% aqueous solution) for addition to the reaction mixture. Since a total of 48 lbs. of water would be necessary to produce a latex containing the desired 54% by weight of polymer, and since 0.64 lb. of water was added in the form of seed latex, and 10.67 lbs. were to be added with the dispersing agent during the course of the reaction, the balance or 36.7 lbs. was added at the beginning of the reaction. Since it was known from previous experience that the reaction could be carried to 95% completion at a temperature of 50° C. in 20 to 25 hours, this temperature was decided to be appropriate for the reaction. At the beginning of the reaction 9 lbs. of the vinyl chloride monomer were introduced, the remaining 51 lbs. being added gradually at a rate of about 2.5 to 3 lbs. per hour over a period of 20 hours.

In summary then, the ingredients present in the reaction vessel at the start of the reaction were as follows, in pounds:

| | |
|---|---|
| Water | 36.7 |
| Potassium persulfate | 0.27 |
| Ammonium hydroxide (28%) | 0.27 |
| Seed latex | 0.80 |
| Vinyl chloride | 9.0 |
| Sodium stearate | 0.0066 |

All of the ingredients except the vinyl chloride monomer were introduced into a reaction vessel equipped with T-shaped off-center agitator driven at 200 R. P. M. to provide moderate agitation, and the air was evacuated. The vinyl chloride monomer was then introduced, and the vessel with its contents was heated to 50° C.; pumping in of additional vinyl chloride monomer at the rate of about 2.5 lbs. per hour, and of the solution of dispersing agent at the rate of about 1.2 lbs. per hour (0.063 lb. per hour of dispersing agent) was begun immediately. The amount of polymer present during the reaction was determined at frequent intervals by taking small samples of reaction mixture and determining the total solids content by the usual method, then correcting for the amount of dispersing agent and catalyst present in the reaction mixture. This value was used as $c$ in Equation 11 to determine the amount of dispersing agent theoretically required. The rate at which the solution of dispersing agent was pumped in was adjusted in accordance with these calculations to maintain the amount present at 25 to 35% of the theoretical amount as nearly as possible. Since the dispersing agent must be introduced very rapidly at the beginning of the reaction, and quite slowly at the end, a pump having a variable delivery is very desirable; since aqueous solutions of many dispersing agents, for example, the sodium stearate used here, tend to gel at room temperature, it is desirable to heat the solution to 40° to 60° C. before pumping it into the reaction mixture.

There are shown in the following table, for varying time intervals after the start of the reaction, the total amount of vinyl chloride which had been added to the reaction mixture, as well as the amount of polymer present in the reaction mixture, the amount of dispersing agent theoretically required as calculated from Equation 11, the actual amount of dispersing agent present, and the percentage of the theoretical amount which was present.

| Time, Hrs. | Vinyl Chlor. added, lb. | Polymer pres. in lb. | Amt. of Disp. Agent theoret. required, lb. | Dispersing Agent Pres. lb. | Per Cent of Theoretical Amount |
|---|---|---|---|---|---|
| 0 | 9.0 | 0.15 | 0.037 | 0.013 | 35 |
| 1 | 11.4 | 4.2 | 0.340 | 0.076 | 22 |
| 2.1 | 14.4 | 8.7 | 0.554 | 0.164 | 30 |
| 4 | 18.9 | 14.1 | 0.765 | 0.20 | 26 |
| 6 | 23.2 | 18.0 | 0.90 | 0.21 | 23 |
| 8 | 27.8 | 22.8 | 1.05 | 0.37 | 35 |
| 10 | 33.3 | 26.4 | 1.16 | 0.37 | 32 |
| 16 | 52.4 | 39.6 | 1.52 | 0.53 | 35 |
| 20 | 60.0 | 49.1 | 1.75 | 0.60 | 34 |
| 23.2 | 60.0 | 57.0 | 1.94 | 0.60 | 31 |

After 23.2 hrs. when the reaction was 95% complete, the latex was removed from the reaction vessel. Examination of a sample with an electron microscope showed that the average diameter of the polymer particles present was 2530 Angstroms. The latex was much more stable, much less viscous, and had a lower surface tension than similar latices prepared using identical recipes, but without controlling the concentration of dispersing agent (i. e. by adding all of the dispersing agent at the start of the reaction).

If the polymerization reaction is carried out using the same ingredients in the same proportions as in the specific example, but adding all of the dispersing agent at the beginning, a great many new particles are initiated so that the average diameter of the polymer particles in the finished latex is reduced; if sufficient initiation occurs, so many particles will be present that the dispersing agent will be insufficient to prevent coalescence or coagulation near the end of the reaction. Likewise, even if the dispersing agent is added gradually during the reaction, if the amount of dispersing agent exceeds the limits of 20% to 60% of the theoretical for any considerable length of time, the size of the polymer particles in the finished latex will vary from that predicted because of either initiation or coalescence or both.

Although the foregoing specific example describes the process of this invention applied to the polymerization of vinyl chloride alone, similar results may be obtained with other monomeric materials within the scope of this invention as defined in the appended claims. Moreover, any of the usual dispersing agents may be employed instead of sodium stearate, such as sodium oleate, ammonium oleate, potassium palmitate, sodium myristate, and rosin or dehydrogenated rosin soaps. There may also be used synthetic saponaceous materials such as hymolal sulfates and alkaryl sulfonates; for example, sodium lauryl sulfate and sodium isopropyl naphthalene sulfonate; and such materials as the dialkyl succinamates, the sodium salt of N-octadecyl-N-1,2-dicarboxyethyl sulfosuccinamate, etc. Mixtures of two or more dispersing agents may also be used; for example, a mixture of equal proportions of the latter compound in the above list and sodium lauryl benzene sulfonate gives excellent results.

While the reaction may be carried out in the presence of air, the rate of reaction ordinarily is faster in an inert atmosphere, that is, in the absence of oxygen, as described in the specific example. Any of the usual catalysts, instead of the one described in the specific example, may be employed in the process of this invention; for example, benzoyl peroxide, caprylyl peroxide, hydrogen peroxide, ammonium persulfate, potassium ferricyanide, sodium perborate, the percarbonates, the persulfates, or the like, or mixtures of two or more of such materials may be used. In order to control the hydrogen ion concentration of the reaction mixture, if desired, ammonium hydroxide may be employed as in the specific example, or any of the other usual buffer salts, such as sodium bicarbonate, sodium acid phosphate, lead acetate, or the like, may be used. If desired, the hydrogen ion concentration may be controlled by adding small amounts of a strong base, such as sodium hydroxide, at suitable intervals during the reaction.

Although the process of this invention may be employed to prepare vinyl polymer latices containing polymer particles of any desired size, it has been found that the most satisfactory latices are those containing particles at least 500 Angstroms in diameter. The upper limit of particle size is not critical since it depends upon the tendency of the polymer particles to settle out of the dispersion, which in turn is largely dependent upon the specific gravity of the polymer. Stable latices containing particles of polyvinyl chloride (specific gravity 1.4) over 6,000 Angstroms in diameter have been prepared. In general, latices containing particles ranging in diameter from 500 to about 20,000 Angstroms or more appear to be most stable. Latices containing particles of smaller average size tend to be unstable; moreover, the ratio of the dispersing agent to the polymer necessary to obtain reasonable stability in such small particle size latices is so high that the properties of the polymer deposited therefrom, for example, by evaporation, are deleteriously affected.

The proportion of polymer to water by weight either in the seed latex or in the finished latex is not critical. It can be shown mathematically that if all of the polymer particles are spheres of identical size, the maximum total volume of the spheres in a given space when the surfaces of adjacent spheres are touching is about 74% of the total space. If the spheres are not of uniform size, the relative volume of the spheres is greater. The maximum proportion of spheres to the total space by weight will depend, of course, on the specific gravity of the spheres (polymer) and of the other components (water, dispersing agents, etc.). For most practical purposes the volume of the polymer will be from about 1% to about 70% of the volume of the latex as a whole, usually from 5% to 65%. In the case of latices containing polyvinyl chloride (specific gravity 1.4) the weight of the polymer will be, therefore, from about 1.4% to about 77% by weight of the latex as a whole, usually from about 7% to about 72%.

Although specific embodiments of the invention have been herein described, it is not intended to limit the invention solely thereto, but to include all of the obvious variations and modifications falling within the spirit and scope of the appended claims.

I claim:

1. In a process of preparing a fluid polymer latex of high concentration having polymer particles of a uniform size between 500 and 20,000 Angstrom units in average diameter, the steps which comprise preparing an aqueous dispersion containing a known quantity of polymer particles of an average diameter above 100 Angstrom units but below that of the particles of said final fluid latex, said polymer particles being prepared by the polymerization in aqueous dispersion of a polymerizable organic compound which contains a single olefinic double bond in the grouping $CH_2=C<$ and which undergoes addition polymerization in aqueous dispersion to form high molecular weight linear polymer, the quantity of said polymer particles present in said dispersion being from 0.05 to 50.0% of the weight of polymer present in said final fluid latex, adding to said dispersion a monomeric material which contains a single olefinic double bond in the grouping $CH_2=C<$ and which undergoes addition polymerization in aqueous dispersion to form high molecular weight linear polymer, causing polymerization of said monomeric material to take place in said dispersion, adding a dispersing agent to said aqueous dispersion while said polymerization progresses, regulating said addition of said dispersing agent to maintain on the surface of said particles throughout said polymerization between 20% and 60% of the amount of dispersing agent theoretically required to provide a closely packed unimolecular layer of said dispersing agent, and stopping said polymerization when the original polymer particles have reached the desired size in the range of 500 to 20,000 Angstrom units.

2. In a process of preparing a fluid polymer latex of high concentration having polymer particles of a uniform size between 500 and 20,000 Angstrom units in average diameter, the steps which comprise preparing an aqueous dispersion containing a known quantity of polymer particles of an average diameter above 100 Angstrom units but below that of the particles of said final fluid latex, said polymer particles being prepared by the polymerization in aqueous dispersion of a monomeric material comprising predominantly a chloroethylene containing from one to two chlorine atoms on one only of the carbon atoms, the quantity of said polymer particles present in said dispersion being from 0.05% to 50.0% of the weight of polymer present in said final fluid latex, adding to said dispersion a monomeric material comprising predominantly a chloroethylene containing from one to two chlorine atoms on one only of the carbon atoms, causing polymerization of said monomeric material to take place in said dispersion, adding a dispersing agent to said aqueous dispersion while said polymerization progresses, regulating said addition of said dispersing agent to maintain on the surface of said particles throughout said polymerization between 20% and 60% of the amount of dispersing agent theoretically required to provide a closely packed unimolecular layer of said dispersing agent, and stopping said polymerization when the original polymer particles have reached the desired size in the range of 500 to 20,000 Angstrom units.

3. In a process of preparing a fluid polymer latex of high solids concentration having particles between 500 and 20,000 Angstrom units in average diameter, the steps which comprise preparing an aqueous dispersion containing a known quantity of polymer particles of an average diameter above 100 Angstrom units but below that of the particles of said final fluid latex, said polymer particles being prepared by the polymerization in aqueous emulsion of a monomeric material comprising predominantly a chloroethylene containing from one to two chlorine atoms on one only of the carbon atoms, the quantity of said polymer particles present in said dispersion being from 0.05% to 50% of the weight of polymer present in said final fluid latex, adding to said dispersion a monomeric material comprising predominantly vinyl chloride, causing polymerization of said monomeric material to take place in said dispersion, adding a dispersing agent to said aqueous dispersion while said polymerization progresses, regulating said addition of said dispersing agent to maintain on the surface of said particles throughout said polymerization between 20% and 60% of the amount of dispersing agent theoretically required to provide a closely packed unimolecular layer of said dispersing agent, and stopping said polymerization when the original polymer particles have reached the desired average diameter in the range of 500 to 20,000 Angstrom units.

4. In a process of preparing a fluid polymer latex of high solids concentration having particles between 500 and 20,000 Angstrom units in average diameter, the steps which comprise preparing an aqueous dispersion containing a known quantity of a previously-prepared polymer latex having polymer particles of a known size above 100 Angstrom units in average diameter but below that of the particles of said final fluid latex, said previously-prepared polymer latex being one prepared by the polymerization in aqueous dispersion of a monomeric material comprising predominantly a chloroethylene, containing from one to two chlorine atoms on one only of the carbon atoms the quantity of polymer in said previously-prepared latex present in said dispersion being from 0.05 to 50% of the weight of polymer present in said final fluid latex, adding to said dispersion a quantity of a monomeric material comprising predominantly a chloroethylene containing from one to two chlorine atoms on one only of the carbon atoms, the amount of said monomers added being not more than twice the weight of polymer in said previously-prepared latex in said dispersion, causing polymerization of said added monomeric material to take place in said dispersion, adding a dispersing agent to said dispersion while said polymerization progresses, continuing to add said monomeric material to said aqueous dispersion as said polymerization progresses to replace the monomeric material polymerized, continuing said addition of said dispersing agent as said polymerization progresses to maintain on the surface of said particles throughout said polymerization between 20% and 60% of the amount of dispersing agent theoretically required to provide a closely packed unimolecular layer of said dispersing agent, and stopping said addition of dispersing agent and said addition of monomeric material when the original particles of said previously-prepared latex have reached the desired average diameter in the range of 500 to 20,000 Angstrom units.

5. In a process of preparing a fluid polymer latex of high solids concentration having particles between 500 and 6,000 Angstrom units in average diameter, the steps which comprise preparing an aqueous dispersion containing a known quantity of polymer particles of a known size above 100 Angstrom units in average diameter but below that of the particles of said final fluid latex, said polymer particles being prepared by the polymerization in aqueous dispersion of a monomeric material comprising predominantly a chloroethylene containing from one to two chlorine atoms on one only of the carbon atoms, the amount of said polymer particles in said dispersion being between 0.05% and 20% of the weight of polymer in said final fluid latex, adding to said dispersion a quantity of a monomeric material comprising predominantly vinyl chloride, the amount of said monomeric material added being not more than the weight of said polymer particles in said dispersion, causing polymerization of said added monomeric material to take place in said dispersion, adding a dispersing agent to said dispersion while said polymerization progresses, continuing the addition of said monomeric material to said aqueous dispersion as said polymerization progresses to replace the monomeric material polymerized, continuing said addition of said dispersing agent as said polymerization progresses to maintain on the surface of said particles throughout said polymerization between 25% and 45% of the amount of dispersing agent theoretically required to provide a closely packed unimolecular layer of said dispersing agent, and stopping said addition of dispersing agent and said addition of monomeric material when the original polymer particles have reached the desired average diameter in the range of 500 to 6,000 Angstrom units.

6. In a process of preparing a fluid vinyl polymer latex of high solids concentration having particles between 500 and 6,000 Angstrom units in average diameter, the steps which comprise preparing an aqueous dispersion containing a known quantity of a previously-prepared vinyl polymer latex having latex particles above 100 Angstrom units in average diameter but below that of the particles of said final fluid latex, said vinyl polymer particles being prepared by the polymerization in aqueous dispersion of a monomeric material comprising predominantly vinyl chloride, the amount of polymer from said previously-prepared latex in said dispersion being from 0.05 to 20% of the weight of polymer in said final fluid latex, adding to said dispersion a quantity of a monomeric material comprising predominantly vinyl chloride, the amount of said monomeric material being not more than the weight of said previously-prepared latex particles already present in said dispersion causing polymerization of said added monomeric material to take place in said dispersion, adding a dispersing agent to said dispersion while said polymerization progresses, continuing the addition of said monomeric material to said aqueous dispersion as said polymerization progresses to replace the monomeric material polymerized, continuing said addition of the dispersing agent as said polymerization progresses to maintain on the surface of said particles throughout said polymerization between 25% and 45% of the amount of dispersing agent theoretically required to provide a closely packed unimolecular layer of said dispersing agent, and stopping said addition of dispersing agent and said addition of monomeric material when the original particles of said previously-prepared vinyl polymer latex have reached the desired average diameter in the range of 500 to 6,000 Angstrom units.

7. In a process of preparing a fluid vinyl polymer latex of high solids concentration having particles between 500 and 6,000 Angstrom units in average diameter, the steps which comprise preparing an aqueous dispersion containing a known quantity of polyvinyl chloride latex particles above 100 Angstrom units in average diameter but below that of the particles of said final fluid latex, the quantity of polyvinyl chloride particles in said dispersion being from 0.05 to 20% of the weight of polymer in said final fluid latex, adding to said dispersion a quantity of vinyl chloride not more than the weight of polyvinyl chloride already present in said dispersion, causing polymerization of said added vinyl chloride to take place in said dispersion, adding a dispersing agent to said dispersion while said polymerization progresses, continuing the addition of said vinyl chloride to said aqueous dispersion as said polymerization progresses to replace the vinyl chloride polymerized, continuing said addition of dispersing agent as said polymerization progresses to maintain on the surface of said particles throughout said polymerization between 25% and 45% of the amount of dispersing agent theoretically required to provide a closely packed unimolecular layer of said dispersing agent, and stopping said addition of said vinyl chloride and said addition of dispersing agent when the original polyvinyl chloride particles have reached the desired size in the range of 500 to 6,000 Angstrom units.

JOHN R. POWERS.

REFERENCES CITED

The following references are of record in the file of this patent:

UNITED STATES PATENTS

| Number | Name | Date |
| --- | --- | --- |
| 2,300,566 | Hahn et al. | Nov. 3, 1942 |
| 2,392,585 | Fryling | Jan. 8, 1946 |